United States Patent
Pourrahimi et al.

(10) Patent No.: US 10,006,579 B1
(45) Date of Patent: *Jun. 26, 2018

(54) FLEXIBLE QUICK-CONNECT HEAT TRANSFER COUPLING FOR CRYOCOOLERS

(71) Applicants: Nadder Pourrahimi, Waltham, MA (US); Shahin Pourrahimi, Brookline, MA (US)

(72) Inventors: Nadder Pourrahimi, Waltham, MA (US); Shahin Pourrahimi, Brookline, MA (US)

(73) Assignee: SUPERCONDUCTING SYSTEMS, INC., Billerica, MA (US)

( * ) Notice: Subject to any disclaimer, the term of this patent is extended or adjusted under 35 U.S.C. 154(b) by 45 days.

This patent is subject to a terminal disclaimer.

(21) Appl. No.: 15/626,294

(22) Filed: Jun. 19, 2017

Related U.S. Application Data (63) Continuation of application No. 13/687,782, filed on Nov. 28, 2012, now Pat. No. 9,719,736, which is a continuation of application No. 13/540,433, filed on Jul. 2, 2012, now abandoned.

(60) Provisional application No. 61/502,899, filed on Jun. 30, 2011.

(51) Int. Cl.
| | |
|---|---|
| *F25B 9/14* | (2006.01) |
| *F16L 53/00* | (2018.01) |
| *F28F 9/26* | (2006.01) |

(52) U.S. Cl.
CPC ............... *F16L 53/00* (2013.01); *F25B 9/14* (2013.01); *F28F 9/26* (2013.01)

(58) Field of Classification Search
CPC ........ F25B 6/14; F25D 19/006; F25D 19/004; F25D 19/04
See application file for complete search history.

(56) References Cited

U.S. PATENT DOCUMENTS

| | | | |
|---|---|---|---|
| 9,719,736 B1 * | 8/2017 | Pourrahimi | ............... F28F 9/26 |
| 2010/0050661 A1 * | 3/2010 | Snow | ........................ F25B 9/14 |
| | | | 62/51.1 |

* cited by examiner

*Primary Examiner* — Brian King
(74) *Attorney, Agent, or Firm* — Law Office of Herbert A. Newborn (57) ABSTRACT

Embodiments for a cryohead heat transfer coupling as well as methods for extracting heat from an article using these couplings are provided. Couplings employ a component made from a material having a greater mean thermal coefficient of expansion than the mean thermal coefficient of expansion of other coupling components and of the article. As a result, differential contraction during cryocooling contributes a shrink fitting of a portion of the coupling resulting in enhanced thermal conduction when cooling and a releasing of the coupling when ambient temperature is restored.

15 Claims, 9 Drawing Sheets

MEAN LINEAR THERMAL EXPANSION OF VARIOUS MATERIALS

Expansion, $\Delta L/L \times 10^5$

| Material (K) | Molded Polyester Rod Reinforced with Glass Fiber | Cast Phenolic Rod | Cast Epoxy Polymer | Nylon Rod | Flourothene | Polystyrene[a] | Polytetra-flouro-ethylene[a] | Pyrex[b] | Cu | Ni | Al | Mg | Zn | Ti | 1020 Low-Carbon Steel | 304 Stainless Steel | Monel | Inconel | Free-Machining Yellow Brass |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 20 | 3 | 14 | 10 | 10 | 21 | 27 | 45 | -1 | 0 | 0 | 0 | 0 | 0 | 0 | 0 | -1.1 | 0 | 0 | 0 |
| 40 | 11 | 38 | 39 | 37 | 65 | 82 | 115 | -2 | 2 | 1 | 0 | 1 | 1 | 1 | 1 | -1.5 | -1.5 | 1 | 4 |
| 60 | 21 | 70 | 78 | 81 | 116 | 152 | 200 | -1.5 | 10 | 4 | 2 | 5 | 9 | 2 | 4 | +2.8 | 6 | 5 | 15 |
| 80 | 34 | 109 | 126 | 142 | 173 | 235 | 300 | +1 | 25 | 12 | 10 | 12 | 28 | 6 | 10 | 14 | 15 | 12 | 34 |
| 100 | 49 | 154 | 181 | 217 | 235 | 329 | 410 | 4.5 | 44 | 23 | 24 | 29 | 57 | 14 | 20 | 30 | 29 | 24 | 57 |
| 120 | 67 | 205 | 242 | 301 | 301 | 432 | 525 | 8.5 | 67 | 38 | 46 | 55 | 93 | 24 | 32 | 50 | 45 | 38 | 85 |
| 140 | 88 | 261 | 310 | 393 | 372 | 542 | 650 | 13 | 92 | 55 | 72 | 87 | 133 | 35 | 47 | 73 | 64 | 55 | 115 |
| 160 | 110 | 321 | 385 | 493 | 444 | 658 | 785 | 17.5 | 119 | 74 | 104 | 124 | 176 | 47 | 63 | 97 | 85 | 74 | 146 |
| 180 | 134 | 385 | 467 | 600 | 531 | 778 | 940 | 22.5 | 148 | 95 | 138 | 164 | 221 | 60 | 81 | 124 | 107 | 95 | 180 |
| 200 | 159 | 452 | 556 | 716 | 618 | 900 | 1130 | 27.5 | 178 | 117 | 175 | 208 | 267 | 74 | 101 | 151 | 130 | 117 | 214 |
| 220 | 184 | 524 | 651 | 841 | 711 | 1024 | 1370 | 33 | 209 | 140 | 214 | 254 | 314 | 89 | 121 | 180 | 155 | 140 | 249 |
| 240 | 210 | 602 | 753 | 977 | 811 | 1152 | 1620 | 39 | 240 | 164 | 255 | 303 | 363 | 105 | 142 | 210 | 180 | 163 | 285 |
| 260 | 237 | 688 | 862 | 1124 | 921 | 1284 | 1875 | 44.5 | 272 | 188 | 297 | 353 | 413 | 121 | 164 | 241 | 207 | 187 | 322 |
| 273.2 | 255 | 749 | 939 | 1228 | 1001 | 1374 | 2045 | | | | | | | | | | | | |
| 280 | 264 | 782 | 980 | 1282 | 1045 | 1422 | 2130 | 50.5 | 305 | 213 | 385 | 453 | 518 | 138 | 187 | 272 | 234 | 212 | 359 |
| 300 | 291 | 889 | 1107 | 1450 | 1187 | 1566 | 2695 | 57 | 339 | 239 | 431 | 503 | 572 | 155 | 210 | 304 | 261 | 238 | 397 |

[a] specimen taken parallel to the rod extrusion direction.
[b] Calculated from data for $SiO_2$ and $B_2O_3$.

Reference: Cryogenic Engineering, Russel B. Scott, 1959 D. Von Nostrand Company Inc.

Figure 6

FLEXIBLE QUICK-CONNECT HEAT TRANSFER COUPLING FOR CRYOCOOLERS

CROSS-REFERENCE TO RELATED APPLICATIONS

This application is a continuation of and claiming benefit of U.S. patent application Ser. No. 13/687,782, filed Nov. 28, 2012 that, in turn, is a continuation of and claims the benefit of U.S. patent application Ser. No. 13/540,433, filed Jul. 2, 2012 that, in turn, claims the benefit of U.S. Provisional Patent Application Ser. No. 61/502,899, filed Jun. 30, 2011, the disclosures of each application incorporated herein by reference in its entirety.

TECHNICAL FIELD

The present disclosure relates to improvement in installation requirements of cryocoolers (also known as cryogenic refrigerators, cryogenic cold heads, or cryogenic coolers). More specifically, embodiments relate to heat transfer couplings, joints, links, or parts that mechanically connect a first-stage and/or a second-stage of a cryocooler to the target components of an article to be cooled.

BACKGROUND ART

Figure 1:
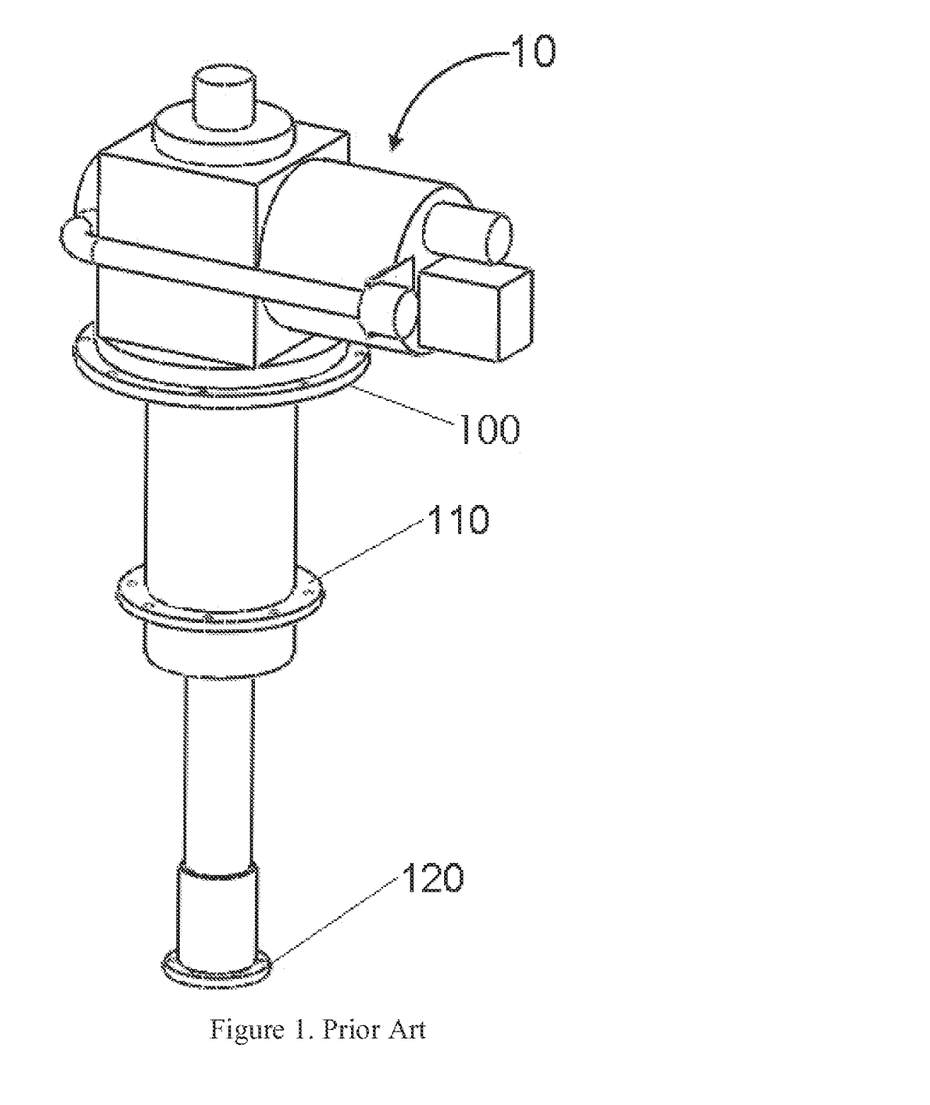
FIG. 1 illustrates a prior art, two stage Gifford-McMahon type cryohead.

Cryocoolers are devices that provide cooling (removal of heat) to very low temperatures. Common cryocoolers are either single-stage where the cryocooler can cool a given component of a device to 30 K, or two-stage, cooling the component to lower than 30 K, often preferably to less than 10 K. There are various types of two-stage cryocoolers, for example Gifford-McMahon (GM) or Pulse Tube, with varying cooling power capacities. Two-stage cryocoolers may be used to cool and keep cool superconducting magnets. A typical cryocooler may be viewed as being comprised of two pieces of hardware, the cryohead (or cold head) and the compressor that are connected by a pair of flexible high pressure hoses. The cryohead is the hardware that is directly attached to the target device to be cooled. In the so called "conduction-cooled" superconducting magnets, heat removal by the cryohead is achieved inside a vacuum chamber, commonly called a cryostat, through conduction by means of physical contacts with the target components of the superconducting magnet such as the coil assembly. FIG. 1 represents the design of a common two-stage GM cryohead 10 that can cool a device to less than 30 K. Notable features of the cryohead 10 are the room temperature flange 100 that connects the cryohead to the room temperature body of a given cryostat, first-stage flange 110 that connects to certain parts of a cryostat that needs to be cooled to and maintained at 30-80 K, often the radiation shield, and second-stage flange 120 often referred to as the cold finger, that connects to a certain part of a device, such as coil assembly of a superconducting magnet, that needs to be cooled to and maintained at less than 30 K. The first-stage 110 and the second-stage 120 of the type of cryohead shown in FIG. 1, that can be used to cool a conduction-cooled superconducting magnet, is commonly housed inside the vacuum space of the cryostat of the superconducting magnet system, other portion of the cryohead is located outside the cryostat where auxiliary hoses and wires are connected to the cryohead. Heat extraction, also known as heat rejection, is often by way of individual couplings, or joints, or links that are bolted, fitted, bonded, or clamped to the first-stage and second-stage flanges, but may be mechanically or metallurgically connected otherwise.

This disclosure relates to how mechanical connections may be made at the first-stage and/or second-stage, or other stages, of a cryohead. Installation of a cryohead of the type shown in FIG. 1 in a conduction-cooled device, such as a conduction-cooled superconducting magnet, requires mechanical attachments to all three flanges. The disclosure teaches the design and use of certain couplings at the first-stage and the second-stage of the cryohead that allow the cryohead to be installed on a device to be cooled by first inserting the cryohead into the cryostat of a device whereby the process of insertion causes socket-like parts of the individual couplings that may be attached to the first-stage and the second-stage flanges to engage the post-like parts of the couplings that may be connected to target components of the device and second connecting the room temperature flange of the cryohead to the room temperature body of the cryostat. The process of insertion causes mechanical engagements by sliding of the socket parts over post parts. Once the cryohead is installed and when the cryohead starts the cooling process the socket parts, that are made from materials that as a whole contract more than the materials of the post, contract and compress over the post parts and produce mechanical-thermal connection desired for good conduction cooling. Those knowledgeable in the art are aware that connection of the cryohead to the room temperature body of the cryostat involves use of various combinations of o-rings, bellows, and various other vacuum fittings, which are not discussed in this disclosure. While the text of this disclosure general applies to mechanical connections at all cooling stages, in this disclosure often we address an embodiment of a mechanical connection made at the second-stage of a two-stage GM cryocooler as an example.

SUMMARY OF THE INVENTION

In a first embodiment, a cryohead heat transfer coupling for extracting heat from an article is provided. The cryohead heat transfer coupling has an annulus having an annulus inner surface. The annulus is made from an annulus material having an annulus mean coefficient of thermal expansion. The coupling has an assemblage in mechanical and conductive thermal communication with the annulus. The assemblage includes at least one flexible, thermally conductive link and at least one thermally conductive block. The at least one block is flexibly coupled to the at least one link at a first link end. The at least one block has a block inner surface. The block has a block outer surface attachable to a portion of the annulus inner surface. The at least one block is made from a block material having a block mean coefficient of thermal expansion at least twenty percent lower than the annulus mean coefficient of thermal expansion. The cryohead heat transfer coupling also has a thermally conductive post integrable with and in conductive thermal communication with the article. The post has a post outer surface, with a portion of the post outer surface being shaped and sized so as to be capable of being mated with the block inner surface. The post is made from a post material having a post mean coefficient of thermal expansion at least twenty percent lower than the annulus mean coefficient of thermal expansion. The post is capable of being disposed within a cavity formed between the annulus and the at least one block. Upon cooling of the coupling, the at least one block is forced into physical and thermal contact with the post and, after cessation of cooling and the coupling reaches ambient temperature, the at least one block tends toward physical release from the post.

The assemblage may also have a plate sized and shaped to mechanically attach to and thermally communicate with a cryohead flange, wherein the at least one link is flexibly attachable to the plate at a second link end. The annulus material may be plastic. The plastic may be acetal, polyester, polyethylene or polyimide. The at least one block material may be copper or copper alloy, aluminum or aluminum alloy.

In further embodiments, the annulus inner surface portion capable of being mated with the at least one block outer surface may be an essentially flat face. The structure of the at least one flexible link may be braid, strand, cable, foil strip or combinations thereof. The post may be hollow and may be filled with an insert material different from the post material. In yet other embodiments, the at least one block outer surface may be attachable to the portion of the inner annulus surface with a spring. The post mean coefficient of thermal expansion and the block mean coefficient of thermal expansion may be at least three hundred percent lower than the annulus mean coefficient of thermal expansion in an embodiment.

In another provided embodiment, a cryohead heat transfer coupling for extracting heat from an article, the article has an attached structure in conductive thermal communication with the article. The structure is made from a material having a structure mean coefficient of thermal expansion. The coupling has a component made from a material having a component mean coefficient of thermal expansion at least twenty percent greater than the structure mean coefficient of thermal expansion, such that upon cooling of the coupling, the component effects a shrink fitting of a portion of the coupling to the structure.

In yet a further embodiment, a cryohead heat transfer coupling socket is provided. The coupling socket has an annulus having an annulus inner surface. The annulus is made from an annulus material having an annulus mean coefficient of thermal expansion. The socket has an assemblage in mechanical and conductive thermal communication with the annulus. The assemblage has at least one flexible, thermally conductive link and at least one thermally conductive block. The at least one block is flexibly coupled to the at least one link at a first link end. The at least one block has a block inner surface. The block has a block outer surface attachable to a portion of the annulus inner surface. The at least one block is made from a block material having a block mean coefficient of thermal expansion at least twenty percent lower than the annulus mean coefficient of thermal expansion.

Embodiments of methods of extracting heat from an article are also provided. A method for extracting heat from an article includes the following: providing a two-stage cryohead and an appropriate cryostat, the cryostat having a radiation shield within it, the cryostat having an outer opening through which first-stage and second-stage portions of the cryohead may be inserted. A first cryohead heat transfer coupling is also provided. The thermally conductive post of the first heat transfer coupling is attached to the article, thereby creating a posted article. A second cryohead heat transfer coupling is provided. The thermally conductive post of the second heat transfer coupling is attached to the radiation shield. The posted article is then housed within the space of the radiation shield inside the cryostat. The first heat transfer coupling is attached to the second-stage of the cryohead; the second heat transfer coupling is attached to the first-stage of the cryohead. After the attaching steps, a portion of the cryohead is inserted inside the cryostat through its appropriate opening with the second coupling attached to the first-stage of the cryohead disposed proximal to the post attached to the radiation shield and with the first coupling attached to the second-stage of the cryohead disposed proximal to the post attached to the article. The cryohead is mounted on the outer body of the cryostat forming a vacuum seal therewith. The cryostat is evacuated and the cryohead is activated. The article from which heat is to be extracted may be the coil assembly of superconducting magnet.

BRIEF DESCRIPTION OF THE DRAWINGS

FIGS. 2a-2d illustrate, in accordance with an embodiment, a cryohead heat transfer coupling for extracting heat from an article.

FIG. 6 is a table displaying representative values of mean thermal coefficient of expansion for some materials of interest.

Detailed Description of Exemplary Embodiments

Consider FIG. 1 and the following five operational preferences for making mechanical connections to the cooling stages of a two-stage cryohead used in a conduction-cooled device:

1. Since heat extraction is achieved through conduction in vacuum, an intimate physical contact is preferred between the coupling and the cryohead, as well as the coupling and the article to be cooled.

2. For improved heat transfer it is preferred to have the intimate physical contact to be under compressive pressure.

3. Since connections of the cooling stages 110, 120 of a cryocooler to an article to be cooled are often made well within a cryostat, affording limited accessibility, it is desirable to connect the couplings to the article to be cooled without the need for bolts or screws or other mechanical fasteners.

4. As heat is removed and components cool down, physical size of all of the components connected together will change. This change may not be uniform and some components will change in size more than others. Therefore it is preferred to incorporate a mechanism to reduce the effect of variation in size of the components that are connected to the cryohead.

Figure 2A:
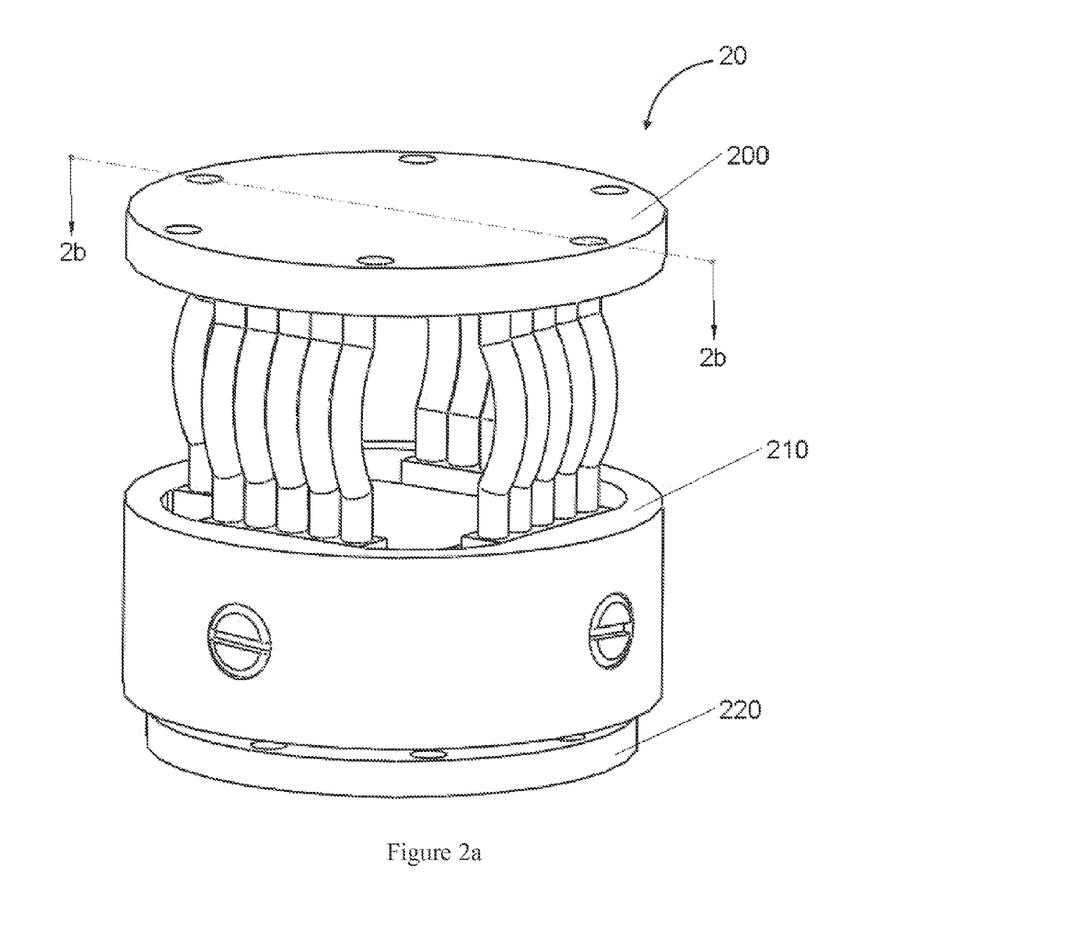
FIG. 2a is an isometric view of a coupling.
Figure 2B:
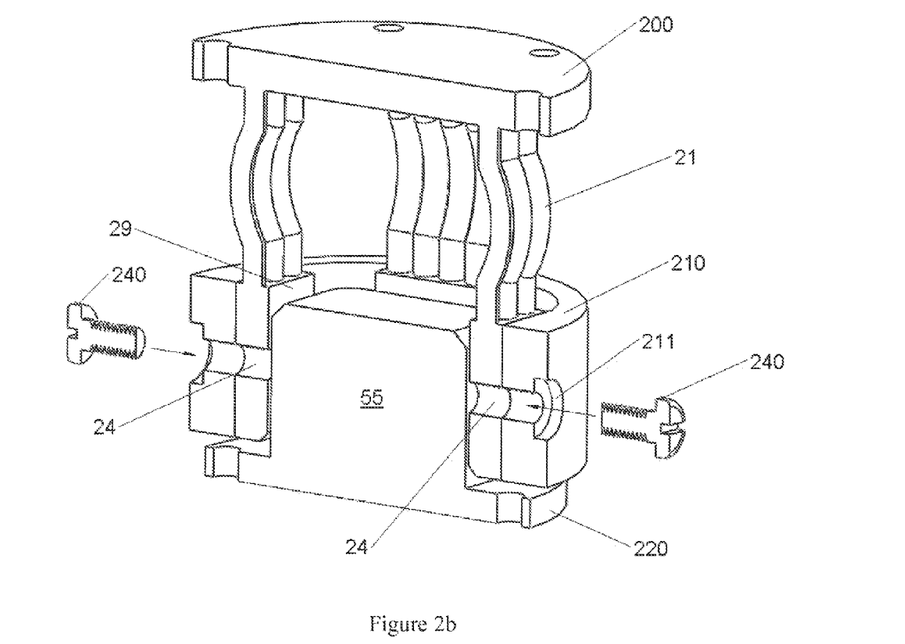
FIG. 2b is an isometric view of a cross section of the coupling.
Figure 2D:
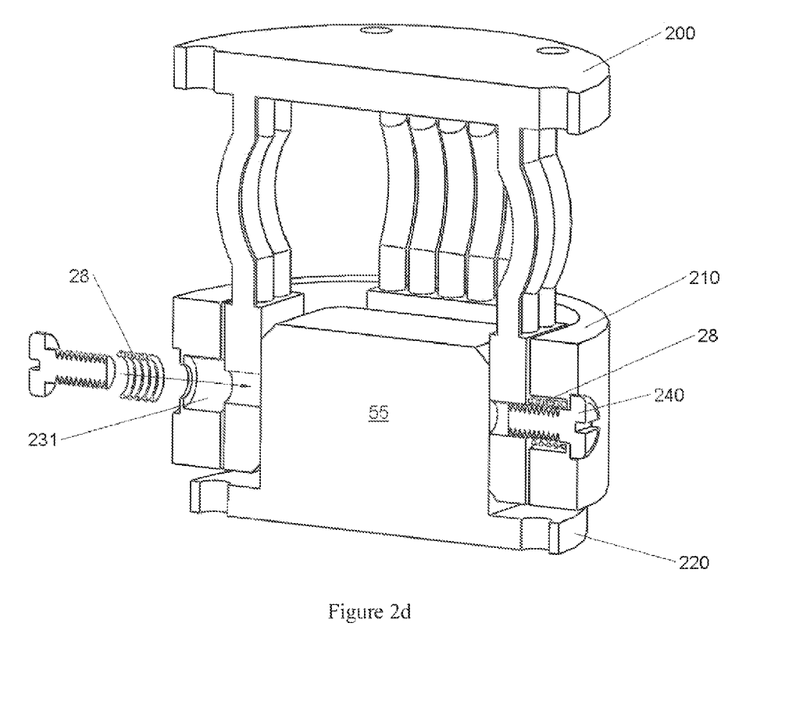
FIG. 2d is a detailed view of a cross section of the coupling that includes at least one spring element.
Figure 3:
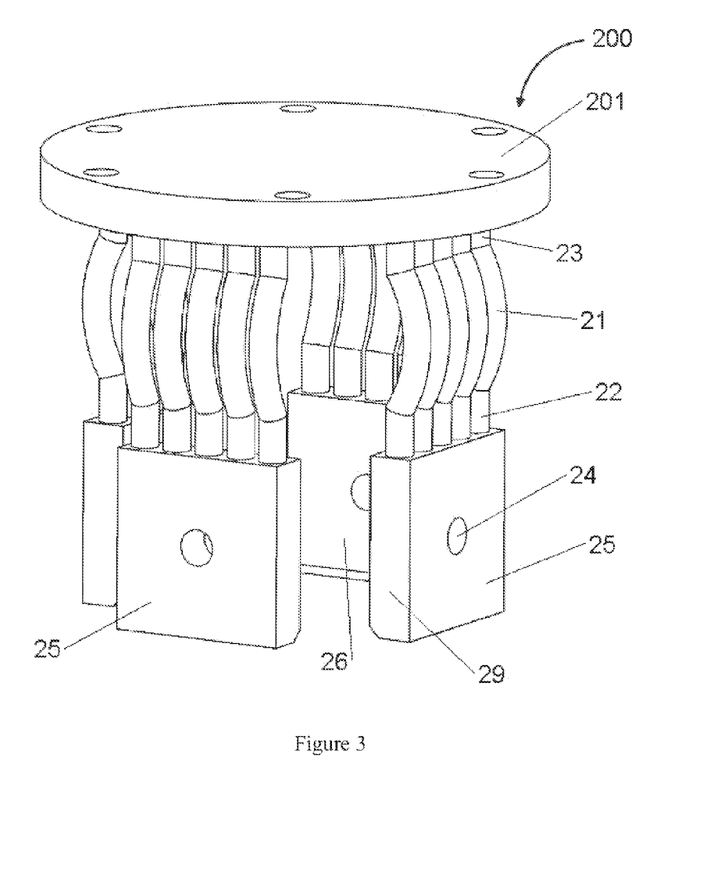
FIG. 3 is a perspective view of, in accordance with an embodiment, a component of a cryohead heat transfer coupling referred to as a "Link Module".

5. Since heat extraction is achieved through conduction, high heat conductivity materials such as copper or its alloys, and aluminum or its alloys are preferred to be used on heat conducting members of the couplings. It is to be understood that while the exemplary embodiments hereinafter specifically address a mechanical connection made at the second-stage of a two-stage GM cryocooler. This particular connection is one of many to which the heat extracting coupling may be applied. Referring to FIG. 2a, coupling 20 has three functional components, namely a link module, an annulus, and a post, each of which is comprised of one or more parts or components. The link module and the annulus together form a socket like device (part). The operation of this socket for the purpose of extracting heat from an article requires a separate component that the socket can fit onto, (such as a post). The socket is made from materials that, when cooled as a whole, contract more than the materials that make up the post. In certain embodiments the post can be made from one material. A description of each of the components is as follows:

Link module 200 is connected to cooling flange 120 of cryohead 10 by screws, clamps or any other suitable method. It is made of copper or other high heat conductivity materials. As shown in the embodiment of FIG. 3 this component is comprised of plate 201 that is connected to cooling flange 120. A number of flexible links 21, as described later, are attached to plate 201 by way of but not limited to soldering, welding, bonding by agents like epoxy, or mechanical clamping one link end 23. The other end 22 of links 21 are attached to a number of blocks 29 made of copper or other high heat conductivity materials. In this embodiment, four blocks 29 are shown; however any number of blocks 29 may be used having any particular shape not limited to rectangular as shown (see FIG. 4). Block 29 has an outer surface 25 that faces the inside surface 30 of annulus 210, and an inner surface 26 that faces post surface 40 (see FIG. 5). Furthermore, block inner surface 26 is shaped to match and mate with post surface 40. A slack is provided along the length of a link (shown as a curved section in the figures) to provide structural flexibility to link 21, and overall to link module 200. Since links 21 flex, blocks 29 flexibly connected other end 22, will have limited free motion in all direction. Blocks 29 may incorporate features such as mounting hole 24 to enable blocks 29 to be mounted on annulus 210. In another embodiment (see FIG. 2d) included is a spring such as compression spring 28 or a spring washer (not shown) to provide blocks 29 with some free motion while connected to annulus 210. The overall length of a link 21, and the size of all the components is determinable by the heat extraction requirements of the system and is no way limited to any specific size.

Figure 4:
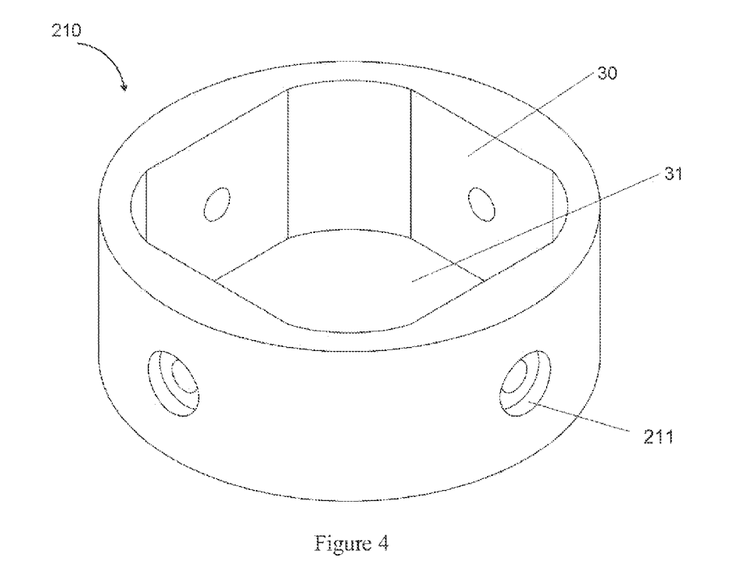
FIG. 4 is a perspective view of, in accordance with an embodiment, a component of a cryohead heat transfer coupling referred to as an "Annulus".

Refer to FIG. 4 as an embodiment of annulus 210. More generally annulus 210 is made of a material that has a mean coefficient of thermal expansion, hereafter termed mean-CTE, as defined, for the purposes of this disclosure, for the temperature range between 3-300 K. FIG. 6 is a table of the mean-CTE of some common materials. The material of annulus 210 is chosen to have at least 20% higher mean-CTE than the material used to fabricate post 55. For example if post 55 is made of copper, annulus 210 may be made of aluminum. In other embodiments, where greater relative freedom of movement is desired between annulus 210 and the post 55, or where larger clearances are needed for more convenient assembly and fitting, the annulus material is chosen to have a mean-CTE of as much as 300% higher (or more) than the mean-CTE of the material chosen for the post. In yet other embodiments the material of annulus 210 is chosen to have a mean-CTE of as much as 400% higher than the mean-CTE of the material chosen for post 55. In other embodiments the material of the annulus 210 is chosen to have a mean-CTE of as much as 500% higher than the mean-CTE of the material chosen for the post. Examples of such annulus materials are plastics such as acetal, polyimide, polyethylene, polyester, etc. The overall shape of annulus 210 may be circular (FIG. 4) or otherwise. Cavity 31 is produced inside annulus 210 such that it could house blocks 29 of link module 200 along with post 55 when coupling 20 is assembled. Blocks 29 are mounted (screwed in the exemplary embodiment) to annulus 210 by way of, for example, mounting holes 211 and screws 240. Blocks 29 may otherwise be connected by other means such as gluing. A spring 28 (FIG. 2d) or a flexible element such as a washer (not shown) may be included between blocks 29 and the inner surfaces of the annulus 210, which may be placed inside the counter bore 231. The springs 28 will slightly push out the blocks 29 and allow the blocks to maintain a compliant physical contact with mating faces 40 of the post 55 (see FIG. 5), once coupling socket assembly is inserted over post 55. This makes heat conduction efficient initially at higher temperatures close to ambient. Springs or flexible elements that incorporated for this purpose will be selected such that they do not hinder the assembly of various components. Inner annulus surface 30 may be selected to match in shape with outer block surface 25 of the blocks 29. Surface 30 may within the scope be different.

Figure 2C:
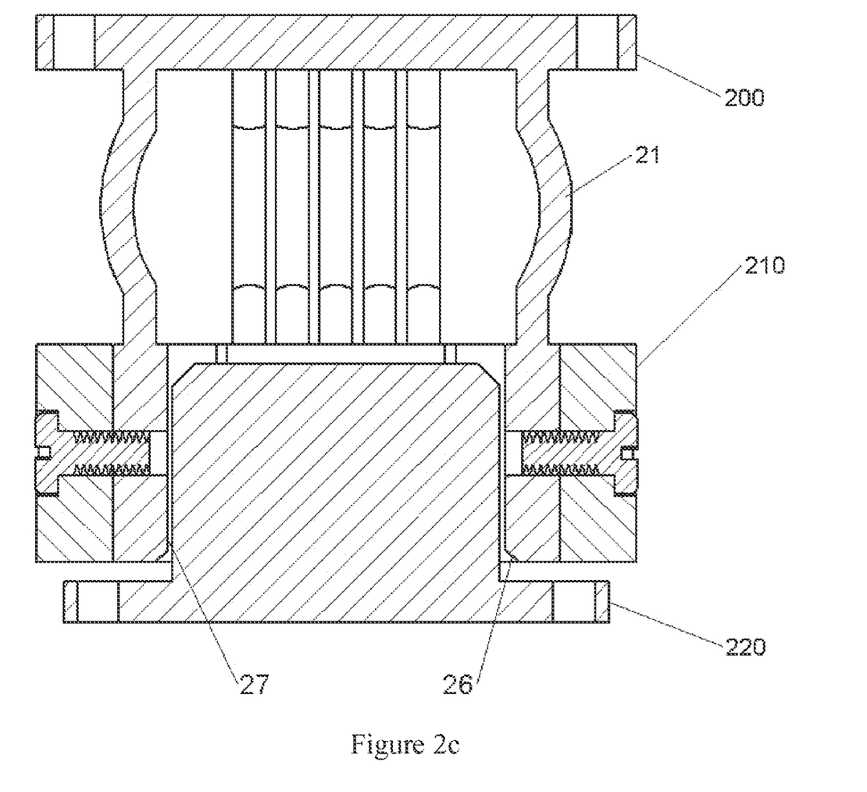
FIG. 2c is a detailed view of a cross section of the coupling.
Figure 5:
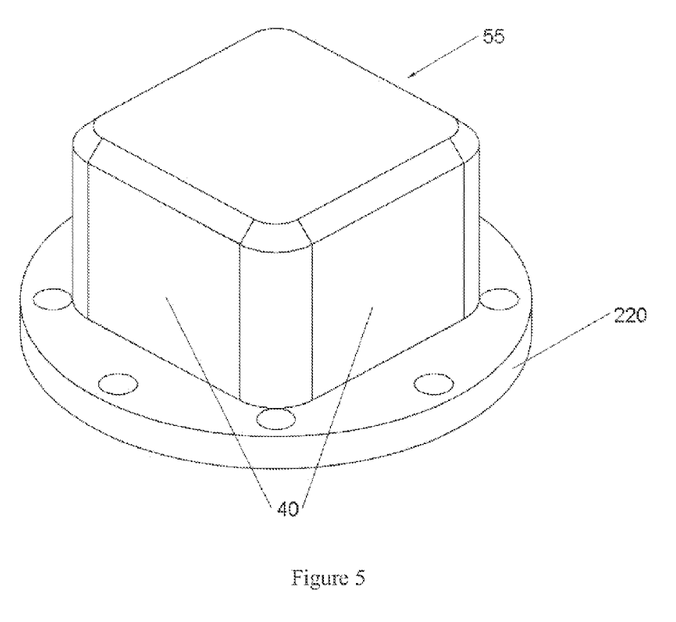
FIG. 5 is a perspective view of, in accordance with an embodiment, a component of a cryohead heat transfer coupling referred to as a "Post".

Post 55 is mechanically attached to the article to be cooled directly or by way of other elements. Refer to FIG. 2a and FIG. 5. Flange 220 with screws, clamps or other suitable elements facilitates attachment of post 55 to the article that is to be cooled by the cryohead. The article may be coil assembly of a superconducting magnet. Flange 220 and post 55 may be fabricated from a solid material as shown in FIG. 5 or otherwise. Post 55 might be copper, copper alloys, aluminum, aluminum alloys, or other high thermal conductivity material. Alternatively, post 55 may be made from a combination of materials that may only include high thermal conductivity elements on surface 40. Post 55 (FIG. 5) has a cross section that provides with one or more post surfaces 40, that match and mate with block outer surfaces 26. The post may be solid or have a cavity, inside which an insert may be placed that is made from a material with a mean-CTE less than that of the post in order to further decrease the overall mean-CTE of the post. As shown in FIG. 2c upon the insertion of socket portion (annulus+link module) of the coupling over post 55 at ambient temperature, post 55 is positioned inside free space between blocks 29 of link module 200, such that each of the surfaces of the post 55 line up with a matching inner surface 26 of a block, while a designated gap 27 is maintained. Gap 27 is commonly designed to be 0.005-0.01 inch. in certain other applications gap 27 may be designed to be 0.01-0.02 inch.

Once the cryohead is turned on, the link module 100 begins to cool. Since blocks 29 of link module 100 are physically connected to annulus 210, annulus 210 will also start to cool down and contract. The contraction of annulus 210 will result in the blocks 29 to tend to "close-in" on post 55 and decrease the dimension of the gap 27. Blocks 29 will follow the contraction of the annulus 210 freely with little hindrance due to the designed flexibility of links 21 (provided by the slack provided in links 21). The flexibility of links 21 also provides a "self aligning" feature to blocks 29 as the blocks 29 close-in. As a result, a perfect alignment or symmetry is not required when the components of the coupling 20 are assembled. If blocks 29 of link module 210 are initially positioned off to one side with respect to post 55, the full shrink-fit effect (as defined in the next paragraph) will still take place.

As cooling proceeds from ambient, so will the contraction of the annulus 210, until gap 27 is eliminated. This occurs because the annulus 210 will contract more than post 55 due to differential in mean-CTE the two components. As cooling continues further, contraction of annulus 210 will result in a clamping or "shrink-fitting" of blocks 29 onto post 55. An intimate contact between the heat conducting surfaces is therefore achieved. This contact is maintained under compression. As heat is extracted from post 55, heat is also extracted from the attached article. It is noted that as blocks 29 and post 25 cool down they will also contract. However, the overall size of annulus 210, blocks 29, and post 55 are to be properly designed in consideration of their respective mean-CTE. As a result the clamping effect and the shrink fit of the coupling 20 will not diminish at a desired cold operating temperature of the cryohead. The combination of the differences in mean-CTE, size of various components, gap (27), starting temperature, final temperature, and mechanical properties of the coupling socket and post 55 determine the compressive pressure that is generated at the interface between block inner surface 26 and post surface 40 as the system cools to its final temperature.

An efficient physically and thermally conductive coupling is enhanced by providing flat mating contact surfaces 26 of blocks 29 and post surfaces 40. It enables the "shrink fit" effect of the coupling to take place without the need to precisely match and maintain the curvatures of mating components, if such non-flat (i.e. curved) surfaces were to be incorporated.

As coupling 20 and the article to be cooled cool down, the size of all of the coupling components will change and relative positions that were established initially at ambient temperature will also change. Therefore, the relative position of link module 210 with respect to the post 55 will change. To compensate for this change, high purity flexible links 21 made of a high heat conductivity material such as copper or silver in form of braids, or cables, or foil strips, or strips of thin sheets are used. The links 21 are uniquely constructed and shaped for mechanical flexibility by incorporating a slack along the length (as opposed to fully stretched), which will allow safe relative displacement between all components being cooled. Links 21 may have the following features:

1 A link may be comprised of a braid or a cable. The braid or the cable is comprised of fine diameter copper strands, e.g. 0.02 inch or less. The fine size of the strand, and the arched configuration of, provides flexibility to the braid or cable.
2 A braid is a relatively loose, cylindrical, helically wound braid such that if the ends are pulled away from each other, the overall diameter of the braid cylinder decreases, and if the ends are moved towards each other, the diameter will increase. This construction of a braid is commonly referred to as 'Chinese Finger Trap'.
3 A braid may be comprised of several nested single-layered braids.
4 A braid may have a cross section other than circular.
5 A cable may be comprised of single strands that are cabled together, or an integrated cable of other smaller cables.
6 In order to achieve a target total heat conduction, many individual links can be incorporated in a coupling.
7 A link may be comprised of strips of foil, or thin sheets of copper or other high heat conductivity material.
8 Any combination of features 3, 5, 7 may be utilized that would result in a link module 210 comprised of any combination of braids, strands, cables and foil strips.

In other to achieve most efficient assembly and operation, the following supplemental elements may be added to the design of the coupling 20:

1 lead chamfers or tapers on the components that slide against each other, mate or fit within each other.
2 To improve heat conduction, use of specialty grease such as Apiezon N, or soft materials such as indium between contacting surfaces.
3 Locking washers or fasteners to keep bolts or screws tight.
4 Features may be added to the components to hold loose components in place during assembly and/or when the cryohead is inserted in and connected to the vacuum chamber. These features will not interfere with the function of a coupling.

An added benefit of this coupling design and numerous embodiments thereof is that the coupling 20 can be connected to the cryohead before the cryohead is connected to the vacuum chamber. No additional assembly is needed to connect the coupling(s) to a post that is already attached to an article. This is a key consideration since often times it is difficult to reach inside the vacuum chamber to make such connections. Furthermore, removal of the cryohead from the vacuum chamber, for example for maintenance or repair work, is also considerably easier. In special designs, this "insert-in pull-out" feature provided for the cryohead by this invention can also enable a vacuum chamber to stay under vacuum and the target equipment effectively cold while the cryohead is removed and replaced. For such a situation, the cryohead is housed inside a chamber such as a sleeve that is itself sealed against the vacuum vessel.

A method of extracting heat from an article, the article likely, but in no way limited to, the coil assembly of a superconducting magnet employs a two-stage cryocooler with an appropriate cryostat. The cryostat has an opening on the outside vessel, and an inner radiation shield. The article/coil assembly of a superconducting magnet has a suitably sized and shaped article post and, as such, is described as a posted article. The article/magnet is housed inside the radiation shield. The radiation shield has a second "shield" post. A first heat transfer coupling socket portion is attached to the second stage of the cryohead and a second heat transfer coupling socket portion is attached to the first stage of the cryohead. The cryohead is inserted into the cryostat through the opening provided on the outer vessel, and is mounted on the vessel, thereby forming a vacuum seal. As a result, the first heat transfer coupling socket portion is disposed in proximity of the article post while the second heat transfer coupling is disposed in proximity of the shield post. The cryostat is evacuated next and the cryohead activated to cool first and second heat transfer couplings thereby cooling the radiation shield and the article/coil assembly of a superconducting magnet to the appropriate temperatures. The method, as described, affords intimate physical contact between the components in both cryohead stages.

Although the invention has been described with reference to several embodiments, it will be understood by one of ordinary skill in the art that various modifications can be made without departing from the spirit and the scope of the invention, as set forth in the claims.

What is claimed is:

1. A cryohead heat transfer coupling for extracting heat from an article, a portion of the coupling attachable to a cooling stage of a cryohead, the cryohead and the coupling, when attached, capable of insertion into a cryostat, the coupling comprising:
   a socket portion, the socket portion attachable to the article, the socket portion comprising:
       an annulus having an annulus inner surface, the annulus made from an annulus material having an annulus mean coefficient of thermal expansion; and an assemblage in mechanical and conductive thermal communication with the annulus, the assemblage comprising:
   at least one flexible, thermally conductive link; and
   at least one thermally conductive block, the at least one block flexibly coupled to the at least one link at a first link end, the at least one block having a block inner surface, the block having a block outer surface attachable to a portion of the annulus inner surface, the at least one block made from a block material having a block mean coefficient of thermal expansion at least twenty percent lower than the annulus mean coefficient of thermal expansion; and
a thermally conductive post portion, the post portion integrable with and in conductive thermal communication with the cryohead, the post portion having a post outer surface, wherein a portion of the post portion outer surface is shaped and sized so as to be capable of being disposed proximal to and mated with the block inner surface, the post portion made from a post material having a post mean coefficient of thermal expansion at least twenty percent lower than the annulus mean coefficient of thermal expansion,
such that, upon cooling of the coupling, the annulus shall contract and cause clamping of the at least one block and the post portion, and such that, after cessation of cooling and subsequent warming of the coupling, the annulus shall expand and unclamp the at least one block and the post portion.

2. The cryohead heat transfer coupling of claim 1, the assemblage further comprising:
   a plate sized and shaped to mechanically attach to and thermally communicate with a cryohead flange, wherein the at least one link is flexibly attachable to the plate at a second link end.

3. The cryohead heat transfer coupling of a wherein the annulus material is plastic.

4. The cryohead heat transfer coupling of claim 3 wherein the plastic is selected from the group consisting of acetal, polyester, polyethylene and polyimide.

5. The cryohead heat transfer coupling of claim 1 wherein the at least one block material is selected from the group consisting of copper and copper alloys.

6. The cryohead heat transfer coupling of claim 1 wherein the at least one block material is selected from the group consisting of aluminum and aluminum alloys.

7. The cryohead heat transfer coupling of claim 1 wherein the post material is selected from the group consisting of copper and copper alloys.

8. The cryohead heat transfer coupling of claim 1 wherein the post material is selected from the group consisting of aluminum and aluminum alloys.

9. The cryohead heat transfer coupling of claim 1 wherein the annulus inner surface portion capable of being mated with the at least one block outer surface is an essentially flat face.

10. The cryohead heat transfer coupling of claim 1 wherein structure of the at least one flexible link is selected from the group consisting of braid, strand, cable, foil strip and combinations thereof.

11. The cryohead heat transfer coupling of claim 1 wherein the post portion is hollow.

12. The cryohead heat transfer coupling of claim 11 wherein an insert material different from the post material fills the post portion.

13. The cryohead heat transfer coupling of claim 1 wherein the at least one block outer surface is attachable to the portion of the inner annulus surface with at least one spring.

14. The cryohead heat transfer coupling of claim 1 wherein the post mean coefficient of thermal expansion and the block mean coefficient of thermal expansion are at least one hundred percent lower than the annulus mean coefficient of thermal expansion.

15. The cryohead heat transfer coupling of claim 1 wherein the post mean coefficient of thermal expansion and the block mean coefficient of thermal expansion are at least three hundred percent lower than the annulus mean coefficient of thermal expansion.

* * * * *